United States Patent
Noguchi et al.

(10) Patent No.: US 8,826,872 B2
(45) Date of Patent: Sep. 9, 2014

(54) VALVE CLOSING/OPENING TIMING CONTROL DEVICE

(75) Inventors: Yuji Noguchi, Obu (JP); Tomohiro Nozawa, Shimotsuke (JP)

(73) Assignee: Aisin Seiki Kabushiki Kaisha, Kariya-Shi, Aichi (JP)

( * ) Notice: Subject to any disclaimer, the term of this patent is extended or adjusted under 35 U.S.C. 154(b) by 0 days.

(21) Appl. No.: 13/504,256

(22) PCT Filed: Sep. 8, 2010

(86) PCT No.: PCT/JP2010/065391
§ 371 (c)(1),
(2), (4) Date: Apr. 26, 2012

(87) PCT Pub. No.: WO2011/052298
PCT Pub. Date: May 5, 2011

(65) Prior Publication Data
US 2012/0216766 A1    Aug. 30, 2012

(30) Foreign Application Priority Data

Oct. 26, 2009   (JP) .................. 2009-245820

(51) Int. Cl.
*F01L 1/34*        (2006.01)
*F16J 15/52*       (2006.01)
*F01L 1/344*       (2006.01)

(52) U.S. Cl.
CPC ............. *F01L 1/3442* (2013.01); *F16J 15/525* (2013.01); *F01L 2001/34479* (2013.01)
USPC .................................................. 123/90.17

(58) Field of Classification Search
USPC ................... 123/90.15, 90.17, 90.37
See application file for complete search history.

(56) References Cited

U.S. PATENT DOCUMENTS

| | | |
|---|---|---|
| 3,915,600 A | 10/1975 | Lamm |
| 5,875,750 A | 3/1999 | Iwasaki et al. |

(Continued)

FOREIGN PATENT DOCUMENTS

| | | |
|---|---|---|
| DE | 2350572 A1 | 4/1975 |
| DE | 19963094 A1 | 6/2001 |

(Continued)

OTHER PUBLICATIONS

Notification of Transmittal of Translation of the International Preliminary Report on Patentability(Chapter I or Chapter II)(PCT/IB/338), International Preliminary Report on Patentability (PCT/IB/373) and the Written Opinion of the International Searching Authority (Form PCT/ISA/237) issued on May 18, 2012, in the corresponding International Application No. PCT/JP2010/065391.

(Continued)

*Primary Examiner* — Thomas Denion
*Assistant Examiner* — Daniel Bernstein
(74) *Attorney, Agent, or Firm* — Buchanan Ingersoll & Rooney PC

(57) ABSTRACT

A valve opening/closing timing control device, including: a drive-side rotating body rotating synchronously with crankshaft; a driven-side rotating body arranged coaxially with the drive-side rotating body and rotating synchronously with a camshaft in an internal combustion engine; a partition section provided to at least one of the drive-side rotating body and the driven-side rotating body so as to partition a fluid pressure chamber into a retard chamber and an advance chamber; a seal member preventing leakage of a working fluid between the retard chamber and the advance chamber; and a biasing member engaging with the seal member by a biasing force caused by elastic deformation and biasing the seal member from the partition section side towards the drive-side rotating body side or the driven-side rotating body side.

8 Claims, 13 Drawing Sheets

(56) References Cited

U.S. PATENT DOCUMENTS

| | | | |
|---|---|---|---|
| 5,957,098 A | 9/1999 | Fukuhara et al. | |
| 6,412,463 B1* | 7/2002 | Kinugawa | 123/90.17 |
| 6,427,654 B2* | 8/2002 | Golbach et al. | 123/90.17 |
| 6,484,678 B2* | 11/2002 | Kinugawa | 123/90.17 |
| 6,516,762 B1* | 2/2003 | Kinugawa et al. | 123/90.17 |
| 7,305,947 B2* | 12/2007 | Lehmann et al. | 123/90.17 |
| 2001/0017117 A1 | 8/2001 | Golbach et al. | |
| 2002/0069844 A1* | 6/2002 | Kinugawa et al. | 123/90.17 |
| 2002/0139334 A1* | 10/2002 | Kinugawa | 123/90.17 |
| 2005/0191171 A1 | 9/2005 | Lehmann et al. | |
| 2007/0113811 A1* | 5/2007 | Grunow et al. | 123/90.17 |
| 2010/0154732 A1* | 6/2010 | Bayrakdar | 123/90.17 |

FOREIGN PATENT DOCUMENTS

| | | |
|---|---|---|
| DE | 10237414 A1 | 3/2004 |
| DE | 102008000757 A1 | 9/2009 |
| JP | 2000-265814 A | 9/2000 |
| JP | 2000-265815 A | 9/2000 |
| JP | 2001-182511 A | 7/2001 |
| JP | 3191809 B2 | 7/2001 |
| JP | 2001-214715 A | 8/2001 |
| JP | 2001-248413 A | 9/2001 |
| JP | 3284924 A | 5/2002 |
| JP | 2002-256823 A | 9/2002 |
| JP | 2008-151214 A | 7/2008 |
| JP | 4218199 B | 2/2009 |
| WO | 2005/113945 A1 | 12/2005 |
| WO | 2009/115155 A1 | 9/2009 |

OTHER PUBLICATIONS

International Search Report (PCT/ISA/210) issued on Nov. 22, 2010, by Japanese Patent Office as the International Searching Authority for International Application No. PCT/JP2010/065391.

Written Opinion (PCT/ISA/237) issued on Nov. 22, 2010, by Japanese Patent Office as the International Searching Authority for International Application No. PCT/JP2010/065391.

Search Report dated Aug. 1, 2013 issued in the corresponding European Patent Application No. 10826433.4.

Japanese Office Action (Reasons for Rejection), dated Jul. 4, 2013, issued by Japanese Patent Office in corresponding Japanese Patent Application No. 2009-245820, and partial English language translation of Japanese Official Action (6 pgs).

* cited by examiner

Fig. 7(A)
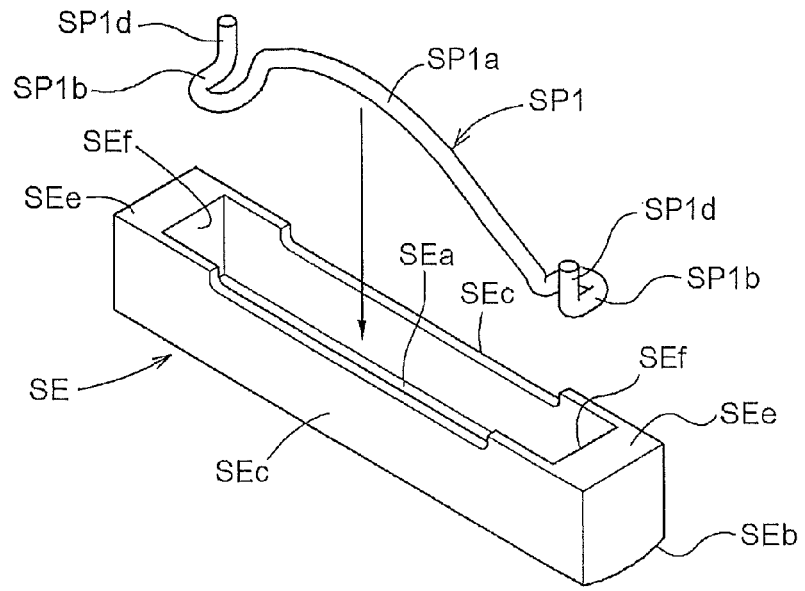
Fig. 7(B)
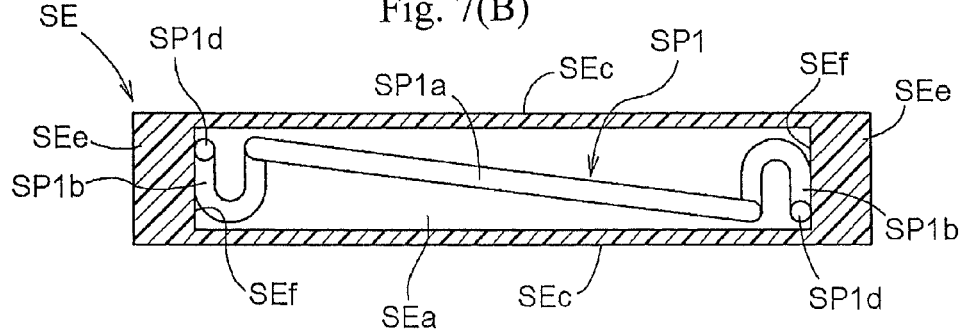
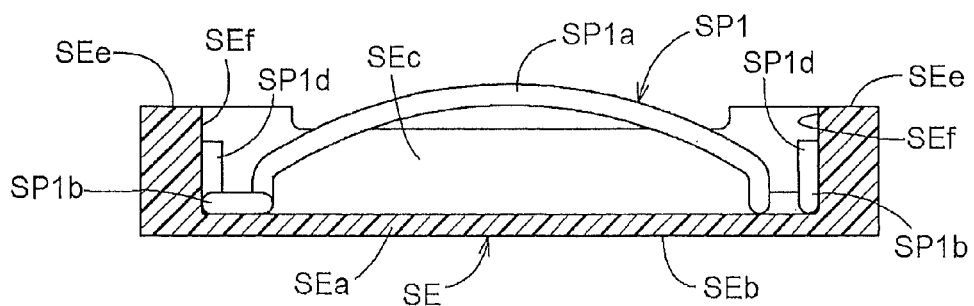
Fig. 7(C)

Fig. 8(A)
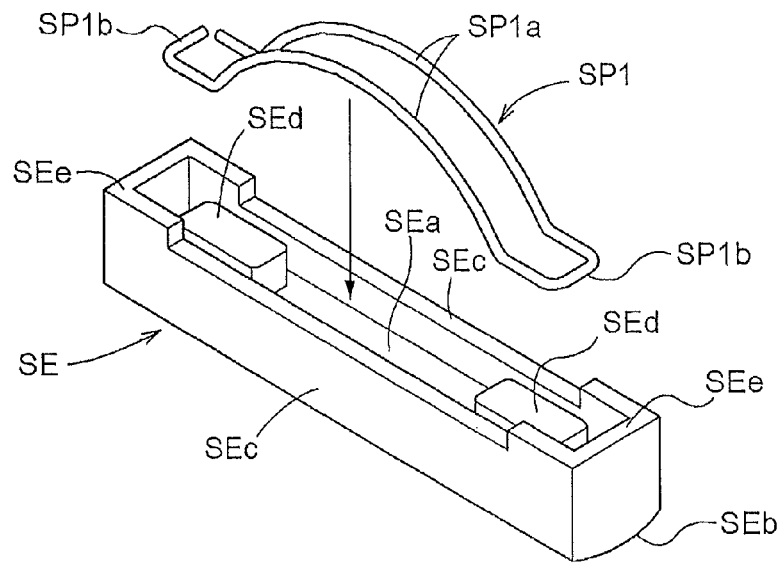
Fig. 8(B)
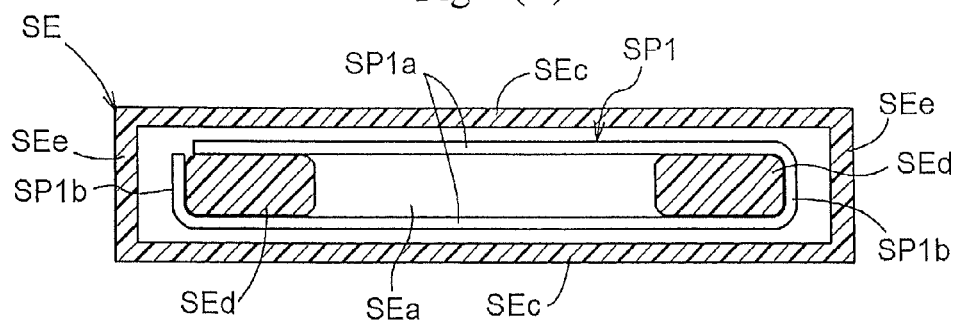
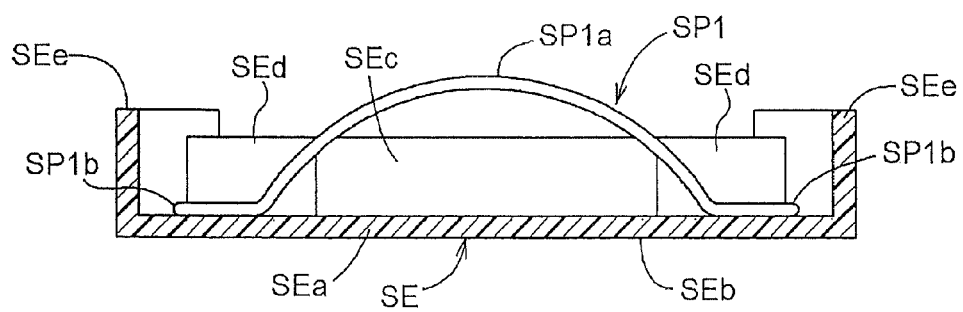
Fig. 8(C)

Fig. 9(A)
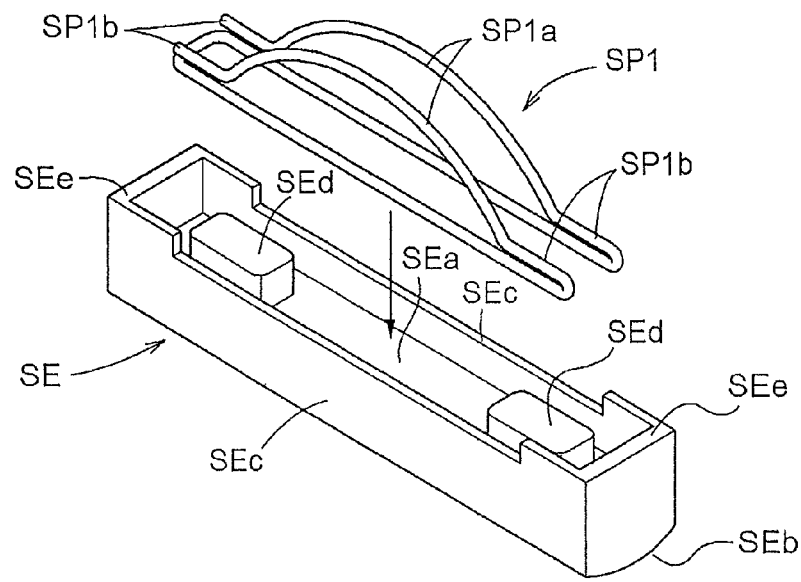
Fig. 9(B)
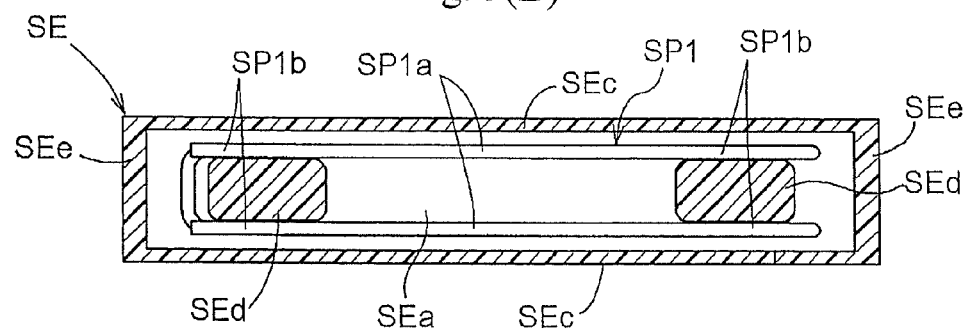
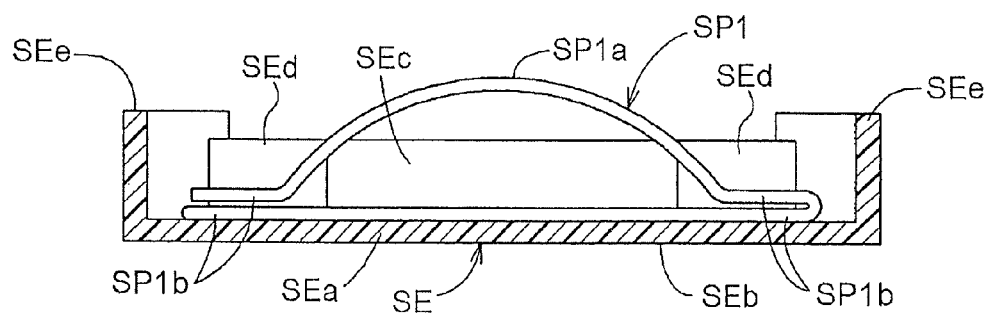
Fig. 9(C)

Fig. 10(A)
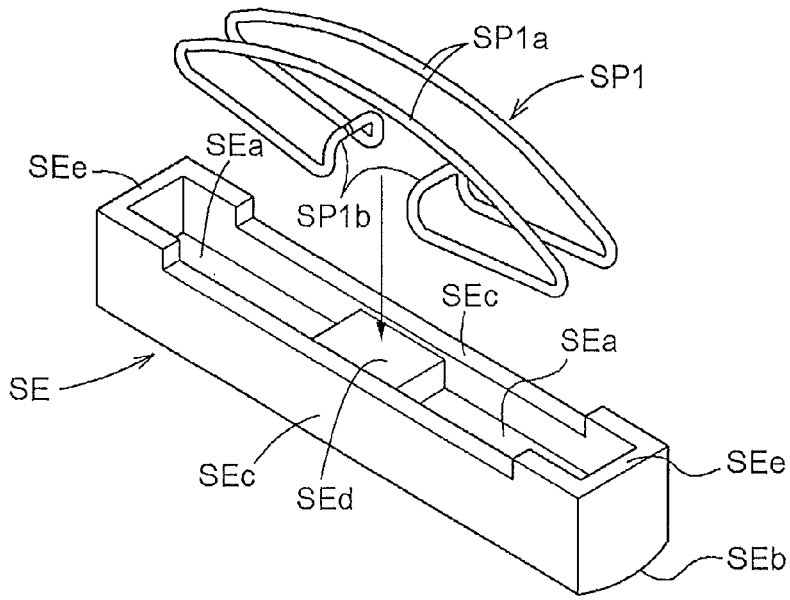
Fig. 10(B)
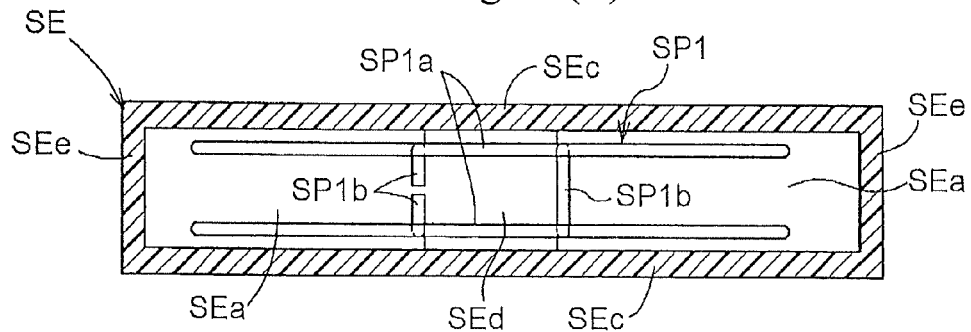
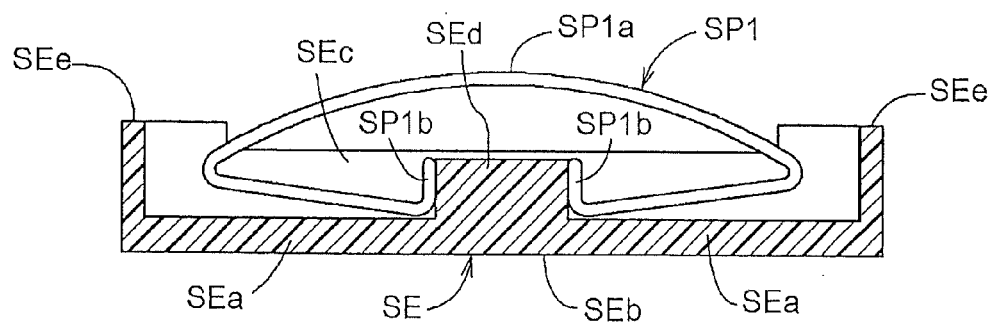
Fig. 10(C)

Fig. 11(A)
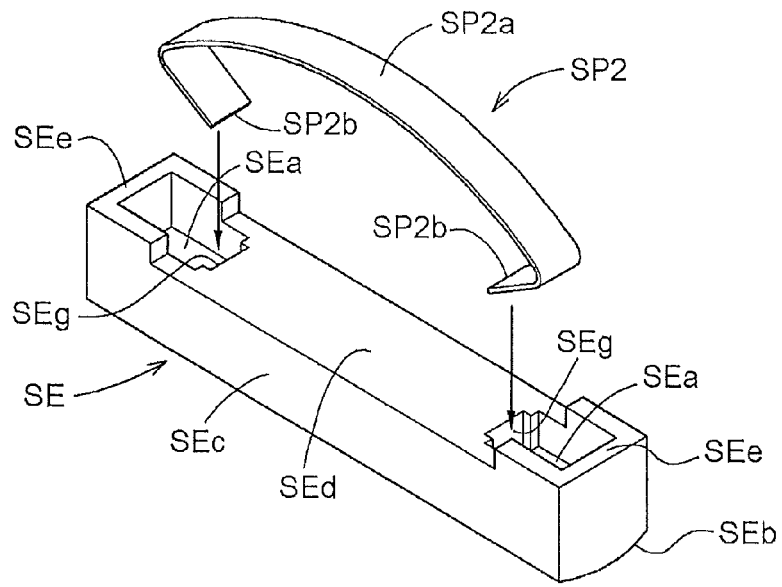
Fig. 11(B)
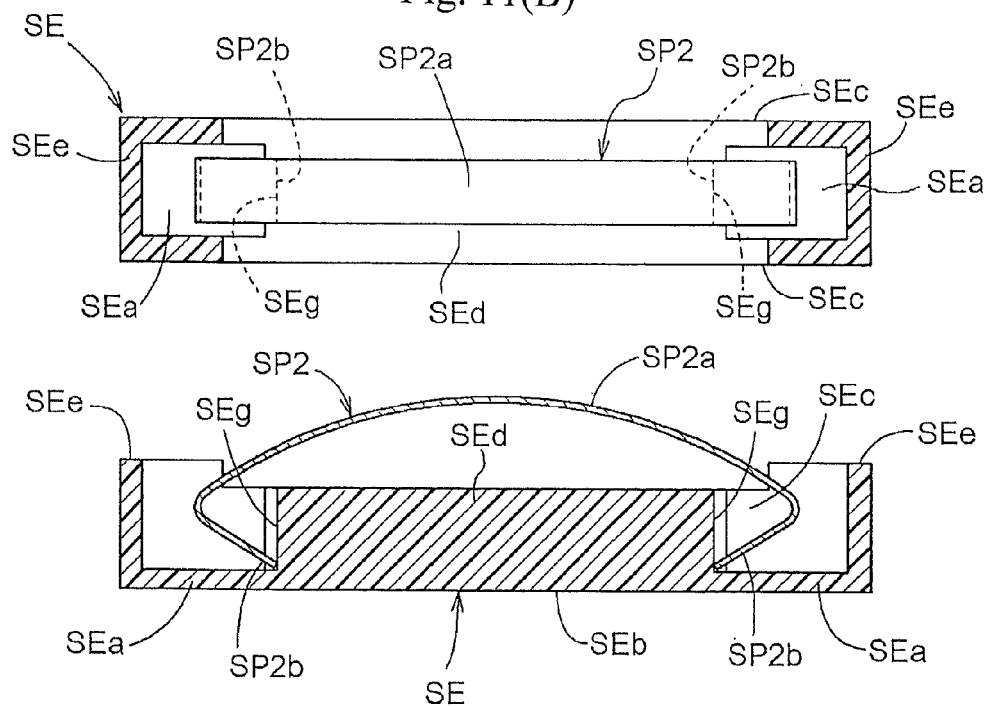
Fig. 11(C)

Fig. 12(A)
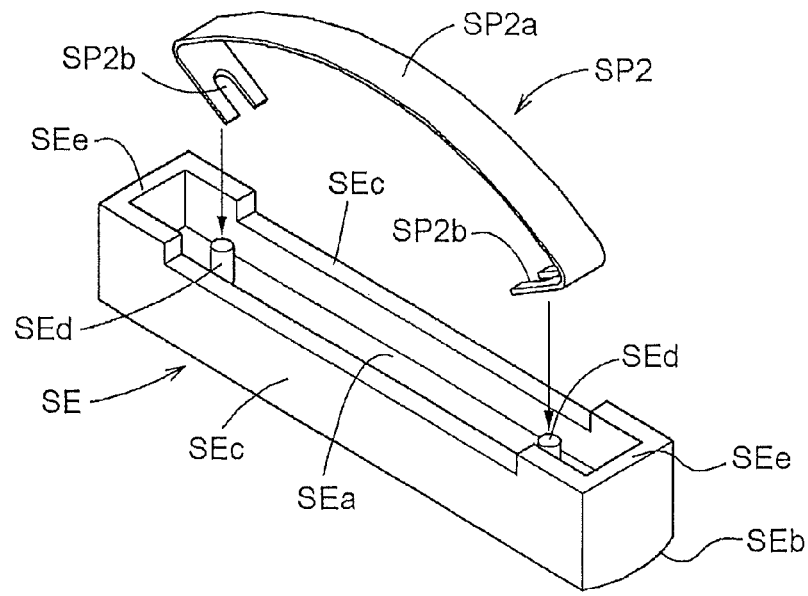
Fig. 12(B)
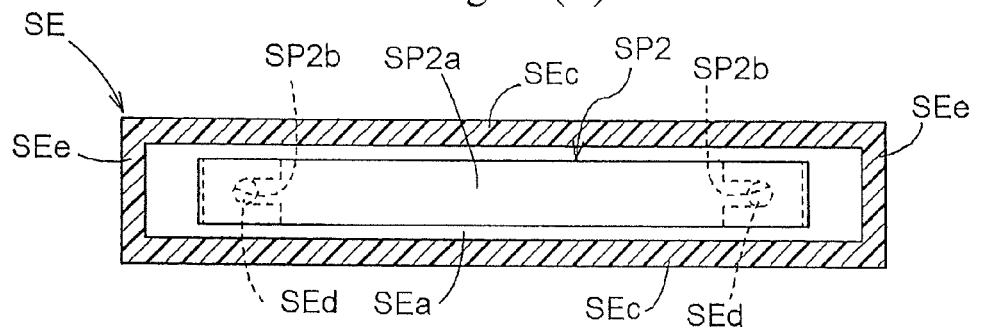
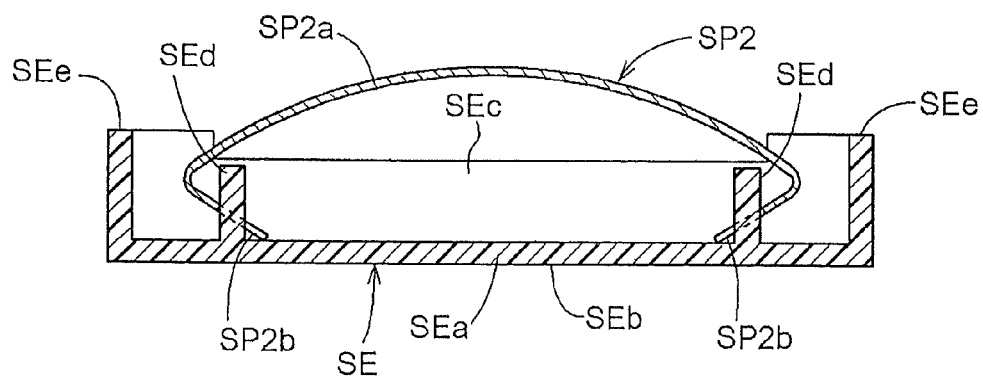
Fig. 12(C)

Fig. 13(A)
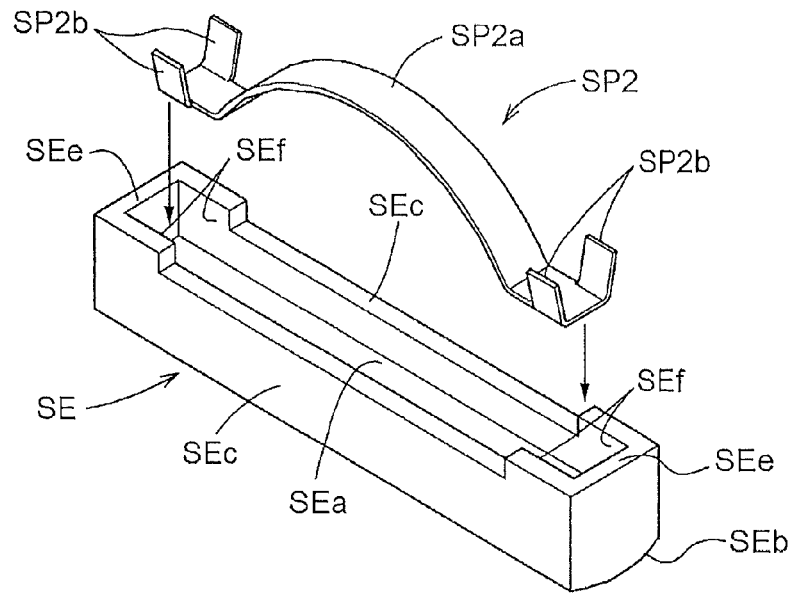
Fig. 13(B)
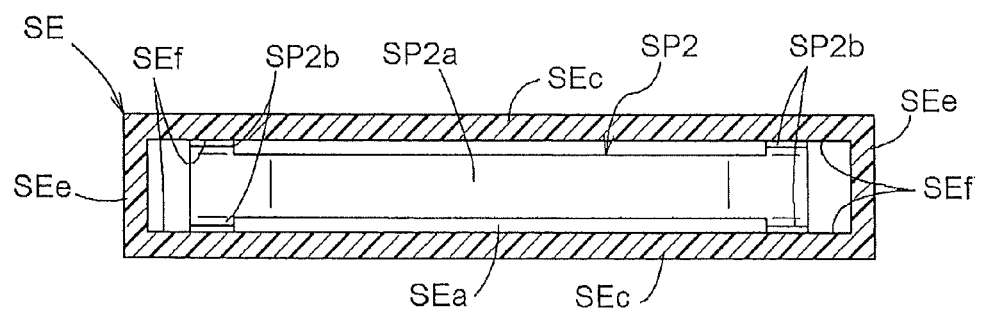
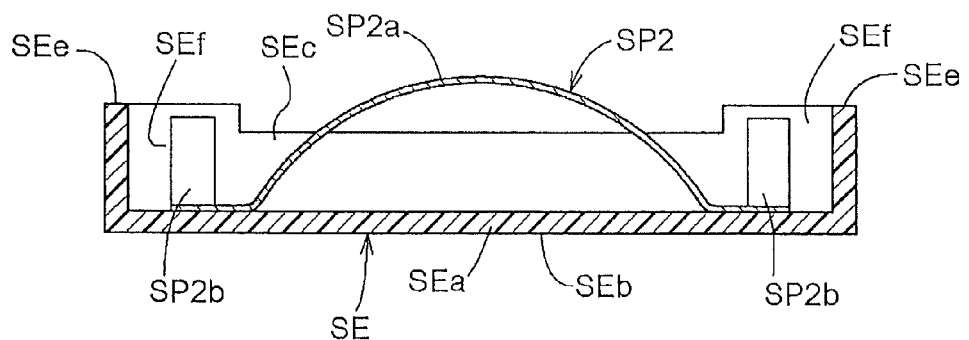
Fig. 13(C)

Fig. 14(A)
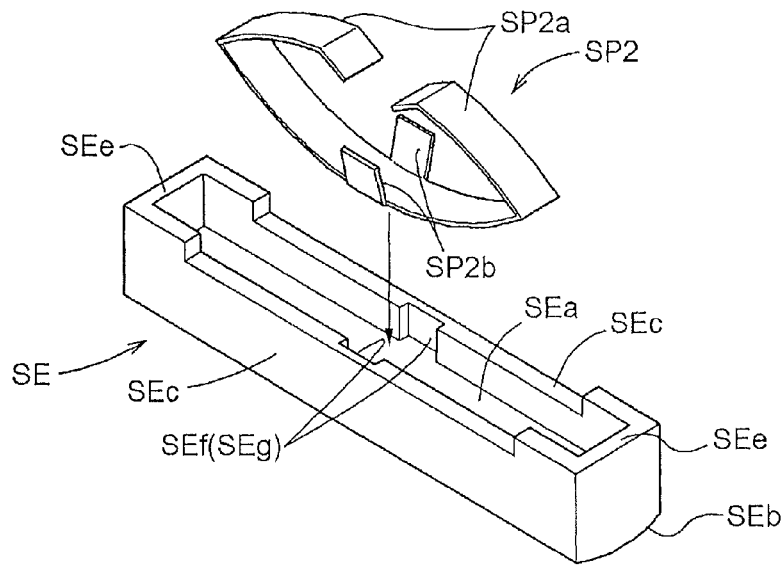
Fig. 14(B)
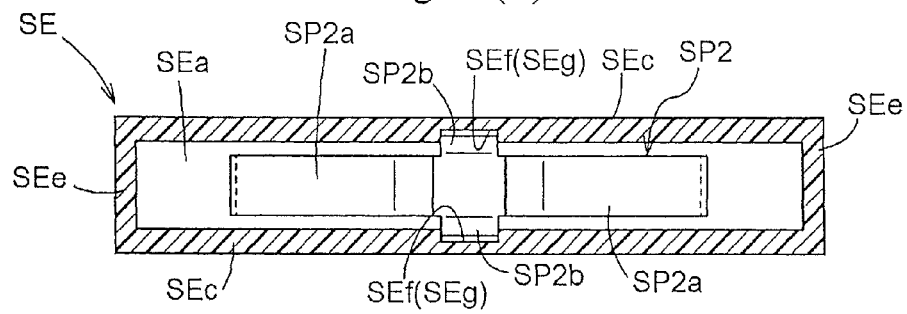
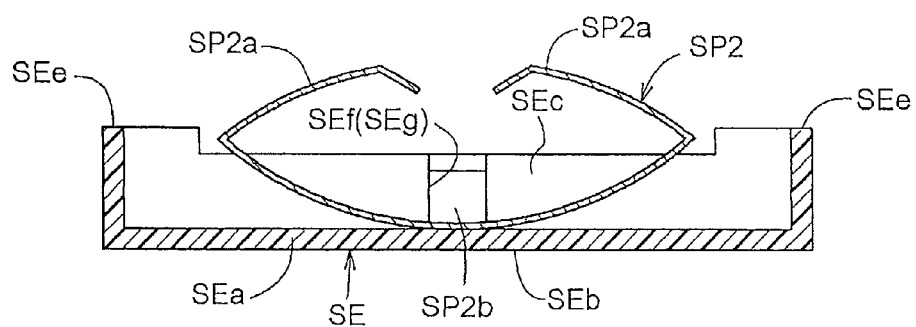
Fig. 14(C)

VALVE CLOSING/OPENING TIMING CONTROL DEVICE

TECHNICAL FIELD

The present invention relates to a valve opening/closing timing control device for adjusting the timing of the opening and closing of an intake valve and an exhaust valve in an internal combustion engine of an automobile or the like according to the running state.

BACKGROUND ART

There are conventional valve opening/closing timing control devices in which a fluid pressure chamber is formed by a drive-side rotating body and a driven-side rotating body, the drive-side rotating body synchronously rotating relative to a crankshaft and the driven-side rotating body being disposed coaxially with respect to the drive-side rotating body and synchronously rotating with a camshaft; the fluid pressure chamber is partitioned into a retard chamber and an advance chamber by a partition section provided to the driven-side rotating body; a working fluid is fed to/discharged from the retard chamber and the advance chamber; and the relative rotational phase of the driven-side rotating body relative to the drive-side rotating body is controlled.

In a valve opening/closing timing control device of this type, it is necessary to prevent leakage of the working fluid between the retard chamber and the advance chamber. For example, in the valve opening/closing timing control device according to Patent Document 1, a seal member ("seal material" in the document) is arranged at a position of a partition section ("vane" in the document) facing the drive-side rotating body ("housing" in the document) or the driven-side rotating body ("vane member" in the document), and to a position of the drive-side rotating body or the driven-side rotating body facing the partition section; and a biasing member ("metallic spring" in the document) for undergoing elastic deformation and exerting a biasing function biases, from the partition section side towards the drive-side rotating body side or the driven-side rotating body side, the seal member arranged on the partition section, and biases, from the drive-side rotating body side or the driven-side rotating body side towards the partition-section, the seal member provided to the drive-side rotating body side or the driven-side rotating body side.

Also, in the valve opening/closing timing control device according to Patent Document 1, the biasing member is integrally bonded to the seal member, with an aim to increase the ease of work when affixing the seal member and the biasing member to the drive-side rotating body or to the driven-side rotating body, and to prevent any instances of negligence in which the biasing member is not affixed. Examples of integral bonding between the seal member and the metallic spring described in the document include insert molding and a method in which a protrusion is formed on the seal member, the protrusion is fitted into a loose hole formed on the metallic spring, and a distal end section of the protrusion is crushed using heat to prevent dislodgement.

A similar technique is also disclosed in Patent Document 2. In a valve opening/closing timing control device according to Patent Document 2, a seal member and a biasing member are integrally formed by injection molding from a synthetic resin. Also, polyphenylene sulfide resin, carbon fiber, and polytetrafluoroethylene are adopted as the synthetic resin, whereby it is possible to obtain an increase in the oil resistance of the seal member, an increase in the biasing force of the biasing member, and a reduction in the friction coefficient of the seal member.

CITATION LIST

Patent Literature

[Patent Document 1] JP2000-265815A
[Patent Document 2] JP2000-265814A

SUMMARY OF INVENTION

Technical Problem

However, in an instance in which insert molding is performed according to the technique of Patent Document 1, disadvantages exist in that, e.g., facilities are required on a larger scale compared to an instance in which injection molding is merely performed on the seal member only, and the material used for the metallic spring is restricted to one that is highly resistant to heat. In an instance according to the technique in Patent Document 1 in which heat treatment is applied to the protrusion after the metallic spring has been positioned on the seal member, there is also a possibility of a portion of the seal member in the vicinity of the protrusion getting burnt and becoming brittle, or of the heat-melted resin in the protrusion blocking the loose hole and causing the loose hole to be dysfunctional. Since a heat treatment step and a cooling step are required, there may also be a possibility of the manufacturing time increasing.

According to the technique of Patent Document 2, since the biasing member is made from a resin, it is possible that the durability will be inferior compared to that of a metallic spring. Also, in the technique of Patent Document 2, it is considered that the finishing accuracy of a connecting portion between the seal member and the biasing member or the accuracy of the thickness of a portion of the biasing member that exerts the biasing force are important. However, looking at the product dimensions of a seal member of a valve opening/closing timing control device in an automotive internal combustion engine, the product dimensions of the seal member and the biasing member are small with regards to attaining the above accuracies. Therefore, there may be a possibility of an excessive burden on manufacturing management.

An object of the present invention is to provide a valve opening/closing timing control device in which a seal member for preventing leakage of a working fluid between a retard chamber and an advance chamber and a biasing member for biasing the seal member can be readily manufactured, and in which the biasing member can be affixed to the seal member in a speedy, simple, and reliable manner.

Solution to Problem

A valve opening/closing timing control device according to a first characterizing aspect of the present invention includes: a drive-side rotating body, which synchronously rotates relative to a crankshaft; a driven-side rotating body, which is arranged coaxially with respect to the drive-side rotating body and which synchronously rotates with a camshaft for opening/closing a valve in an internal combustion engine; a partition section, which is provided to at least one of the drive-side rotating body and the driven-side rotating body so as to partition a fluid pressure chamber, which is formed by the drive-side rotating body and the driven-side rotating body, into a retard chamber and an advance chamber; a seal member, which is arranged either at a position, of the partition section, facing the drive-side rotating body or the driven-side rotating body, or at a position, of the drive-side rotating body or the driven-side rotating body, facing the partition section, and which prevents leakage of a working fluid between the retard chamber and the advance chamber caused by a relative rotation between the drive-side rotating body and the driven-side rotating body; and a biasing member, which engages with the seal member by a biasing force caused by elastic deformation, and which either biases the seal member from the partition section side towards the drive-side rotating body side or the driven-side rotating body side, or biases the seal member from the drive-side rotating body side or the driven-side rotating body side towards the partition section side.

According to the aspect described above, the seal member and the biasing member are separate members, and can be manufactured with ease. When the biasing member is affixed to the seal member, the biasing member is elastically deformed, and the biasing member engages with the seal member by a biasing force caused by the elastic deformation. Accordingly, the biasing member has a biasing force biasing the seal member so as to prevent leakage of the working fluid and a biasing force acting to engage the biasing member itself to the seal member. It is thereby possible to affix the biasing member to the seal member in a speedy, simple, and reliable manner without performing a special treatment such as insert molding or heat treatment.

A valve opening/closing timing control device according to a second characterizing aspect of the present invention includes: a convex section is formed on the seal member; and the biasing member is configured so that the convex section is clamped by a biasing force caused by elastic deformation and the biasing member engages with the seal member.

According to the aspect described above, the biasing member clasps the convex section and thereby engages with the seal member. For example, if the width of a site at two locations on the biasing member is formed so as to be smaller than the width of the convex section, pushing down the biasing member to a predetermined position on the convex section causes the biasing member to elastically deform. Accordingly, a biasing force is generated due to elastic deformation of the biasing member, and the biasing member clamps the convex section. As a result, the biasing member engages with the seal member. The biasing member can thus be rapidly and readily affixed to the seal member. The engaging of the biasing member to the seal member may be configured so that only one location of the biasing member engages with one location of the convex section, a plurality of locations of the biasing member engage with one location of the convex section, or a plurality of locations of the biasing member engage with a plurality of locations of the convex section.

A valve opening/closing timing control device according to a third characterizing aspect of the present invention includes: a recess section is formed on the seal member; and the biasing member is configured so that two side surfaces of the recess section that face each other are pressed by a biasing force caused by elastic deformation and the biasing member engages with the seal member.

According to the aspect described above, the biasing member presses two side surfaces of the recess section that face each other and thereby engages with the seal member. For example, if the width of a site at two locations on the biasing member is formed so as to be greater than the width of the recess section, pushing down the recess section to a predetermined position on the recess section causes the biasing member to elastically deform. Specifically, a biasing force is generated due to elastic deformation of the biasing member, and the biasing member presses against the two side walls. As a result, the biasing member engages with the seal member. The biasing member can thus be rapidly and readily affixed to the seal member. The engaging of the biasing member to the seal member may be configured so that only one location of the biasing member engages with one location of the recess section, a plurality of locations of the biasing member engage with one location of the recess section, or a plurality of locations of the biasing member engage with a plurality of locations of the recess section.

According to a valve opening/closing timing control device of a fourth characterizing aspect of the present invention, a convex section is formed at two locations on the seal member; and the biasing member is configured so that in a state in which individual sites at two locations on the biasing member independently and respectively engage with the convex sections at the two locations, the convex sections in the two locations are clamped by a biasing force caused by elastic deformation, and the biasing member engages with the seal member.

According to the aspect described above, the biasing member clasps convex sections at two locations from the outside together at the same time, and thereby engages with the seal member. For example, if the width of the biasing member is formed so as to be smaller than the distance between respective outer side surfaces of the convex sections at two locations, pushing down the biasing member to a predetermined position on the convex section causes the biasing member to elastically deform. Accordingly, a biasing force is generated due to elastic deformation of the biasing member, and the biasing member clamps the convex section. As a result, the biasing member engages with the seal member. The biasing member can thus be rapidly and readily affixed to the seal member. It is also possible to arrange the biasing member relative to the seal member in a well-balanced manner merely by adjusting the distance of separation between the convex sections at two locations according to the shape and the size of the biasing member. Accordingly, the biasing member becomes stable with respect to the seal member. The engaging of sites at two locations on the biasing member onto the convex sections at two locations may take place at one location or at a plurality of locations.

According to a valve opening/closing timing control device of a fifth characterizing aspect of the present invention, the biasing member is configured from a wire spring.

Since a wire spring has a substantially circular cross-section, its second moment of area is substantially the same magnitude in all directions. If the biasing member is configured from a wire spring as with the aspect described above, bending treatment can be performed freely in any direction, increasing the range of options in terms of the shape of the biasing member. Therefore, it is possible to accommodate any increase in the complexity of the shape of the seal member. Also, by folding the wire spring over several times, the magnitude of the biasing force can be readily changed using an existing material. It is also possible to readily perform a partial adjustment of the biasing force, such as reducing the biasing force at a portion that engages with the seal member and increasing the biasing force at a portion that biases the seal member.

According to a valve opening/closing timing control device of a sixth characterizing aspect of the present invention, the biasing member is configured from a plate spring.

Since a plate spring has a substantially rectangular cross-section, its biasing force can be readily adjusted using its thickness or width. If the biasing member is configured from a plate spring as with the aspect described above, the biasing force can be readily adjusted without increasing the complexity of the shape of the biasing member in an instance such as where it is necessary to increase the biasing force with which the seal member is biased when there is a limitation in terms of the shape of the biasing member.

According to a valve opening/closing timing control device of a seventh characterizing aspect of the present invention, a restricting section for restricting the range of elastic deformation of the biasing member is provided across the seal member and the partition section so that the biasing member does not become sandwiched between the seal member and the partition section and does not undergo plastic deformation.

When the valve opening/closing timing control device is being assembled, the seal member is pressed against and affixed to the partition section while the biasing member is oriented towards the partition section side. However, if the corresponding pressing force is too great, there may be a possibility of the deformation of the biasing member exceeding the yield point and of the biasing member deforming plastically. In such an instance, the biasing member loses the biasing force necessary to bias the seal member. According to the aspect described above, the range of elastic deformation of the biasing member is restricted, and the biasing member therefore does not become sandwiched between the seal member and the partition section and deform plastically. Therefore, it is possible to assemble the valve opening/closing timing control device without losing, with regards to the biasing force of the biasing member, the appropriate biasing force necessary to bias the seal member.

According to a valve opening/closing timing control device of an eighth characterizing aspect of the present invention, a restricting section for restricting the range of elastic deformation of the biasing member is provided across the seal member and the drive-side rotating body or the driven-side rotating body facing the partition section so that the biasing member does not become sandwiched between the seal member and the drive-side rotating body or the driven-side rotating body facing the partition section and does not undergo plastic deformation.

When the valve opening/closing timing control device is being assembled, the seal member is pressed against the drive-side rotating body or the driven-side rotating body and affixed while the biasing member is oriented towards the drive-side rotating body side or the driven-side rotating body side. However, if the corresponding pressing force is too great, there may be a possibility of the deformation of the biasing member exceeding the yield point and of the biasing member deforming plastically. In such an instance, the biasing member loses the biasing force necessary to bias the seal member. According to the aspect described above, the range of elastic deformation of the biasing member is restricted, and the biasing member therefore does not become sandwiched between the seal member and the partition section and deform plastically. Therefore, it is possible to assemble the valve opening/closing timing control device without losing, with regards to the biasing force of the biasing member, the appropriate biasing force necessary to bias the seal member.

BRIEF DESCRIPTION OF DRAWINGS

FIG. 7 is a drawing showing a seal member and a wire spring according to a second alternative embodiment, where (A) is an exploded perspective view, (B) is a lateral cross-section view after the biasing member has been affixed, and (C) is a vertical cross-section view after the biasing member has been affixed;

FIG. 8 is a drawing showing a seal member and a wire spring according to a third alternative embodiment, where (A) is an exploded perspective view, (B) is a lateral cross-section view after the biasing member has been affixed, and (C) is a vertical cross-section view after the biasing member has been affixed;

FIG. 9 is a drawing showing a seal member and a wire spring according to a fourth alternative embodiment, where (A) is an exploded perspective view, (B) is a lateral cross-section view after the biasing member has been affixed, and (C) is a vertical cross-section view after the biasing member has been affixed;

FIG. 10 is a drawing showing a seal member and a wire spring according to a fifth alternative embodiment, where (A) is an exploded perspective view, (B) is a lateral cross-section view after the biasing member has been affixed, and (C) is a vertical cross-section view after the biasing member has been affixed;

FIG. 11 is a drawing showing a seal member and a plate spring according to a sixth alternative embodiment, where (A) is an exploded perspective view, (B) is a lateral cross-section view after the biasing member has been affixed, and (C) is a vertical cross-section view after the biasing member has been affixed;

FIG. 12 is a drawing showing a seal member and a plate spring according to a seventh alternative embodiment, where (A) is an exploded perspective view, (B) is a lateral cross-section view after the biasing member has been affixed, and (C) is a vertical cross-section view after the biasing member has been affixed;

FIG. 13 is a drawing showing a seal member and a plate spring according to a eighth alternative embodiment, where (A) is an exploded perspective view, (B) is a lateral cross-section view after the biasing member has been affixed, and (C) is a vertical cross-section view after the biasing member has been affixed;

FIG. 14 is a drawing showing a seal member and a plate spring according to a ninth alternative embodiment, where (A) is an exploded perspective view, (B) is a lateral cross-section view after the biasing member has been affixed, and (C) is a vertical cross-section view after the biasing member has been affixed.

DESCRIPTION OF EMBODIMENTS

An embodiment in which the present invention is applied as a valve opening/closing timing control device on an intake-valve side of an automotive engine will now be described with reference to FIGS. 1 through 5. In the present embodiment, the automotive engine corresponds to an internal combustion engine.

[Overall Configuration]

Figure 1:
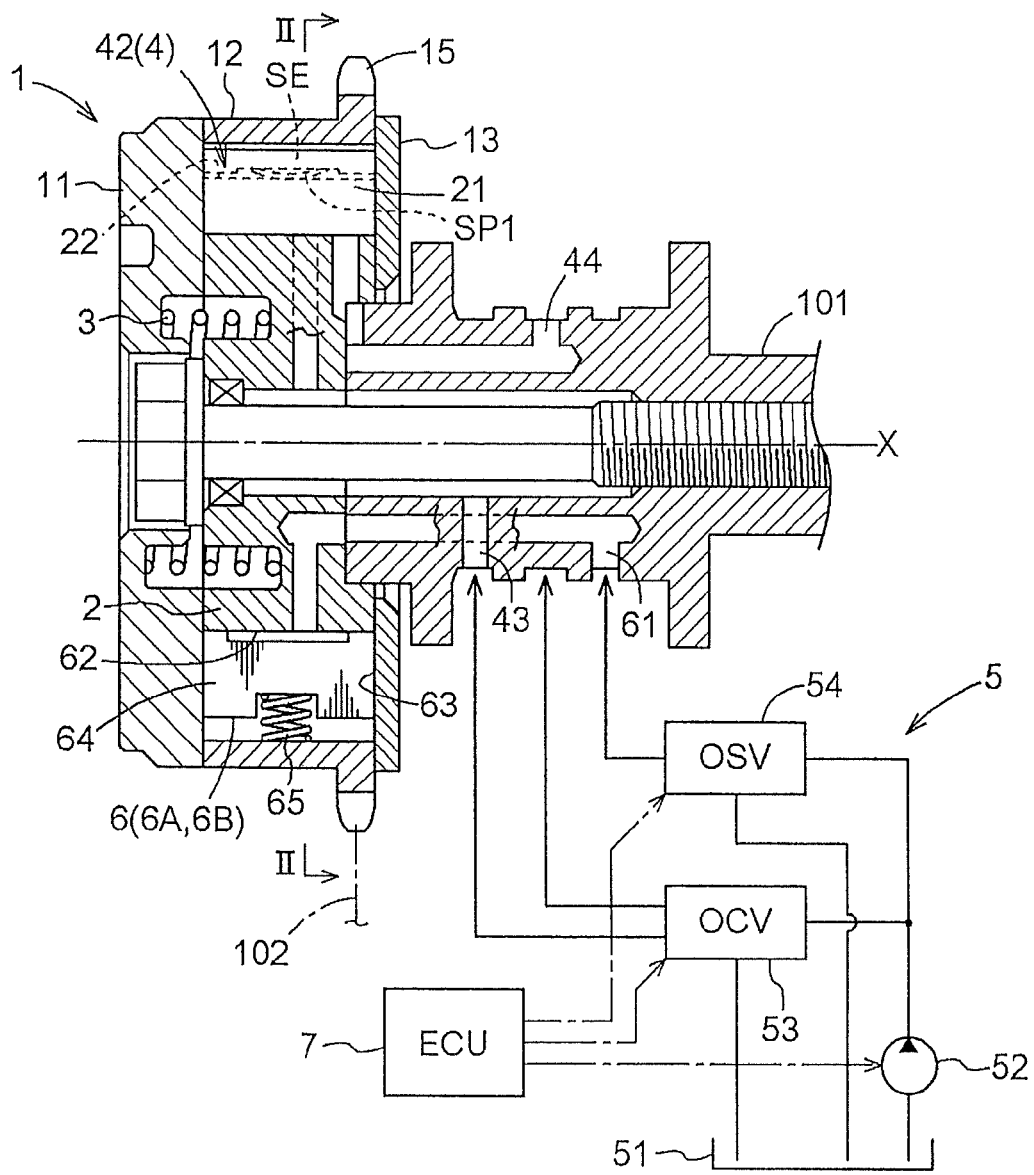
FIG. 1 is a view showing an overall configuration of the valve opening/closing timing control device according to the present invention.

As shown in FIG. 1, this valve opening/closing timing control device includes a housing 1, which functions as a drive-side rotating body for synchronously rotating relative to a crank shaft of an engine (not shown), and an internal rotor 2, which functions as a driven-side rotating body arranged coaxially with respect to the housing 1, synchronously rotating with a camshaft 101. The camshaft 101 is a rotating shaft of a cam (not shown) for controlling the opening/closing timing of an intake valve of the engine. The camshaft 101 is rotatably affixed to a cylinder head of the engine (not shown).

[Internal Rotor and Housing]

The internal rotor 2 is integrally affixed to a distal end section of the camshaft 101 as shown in FIG. 1. The housing 1 includes a front plate 11 on a side opposite a side to which the camshaft 101 is connected, an external rotor 12 integrally including a timing sprocket 15, and a rear plate 13 on the side to which the camshaft 101 is connected.

Figure 2:
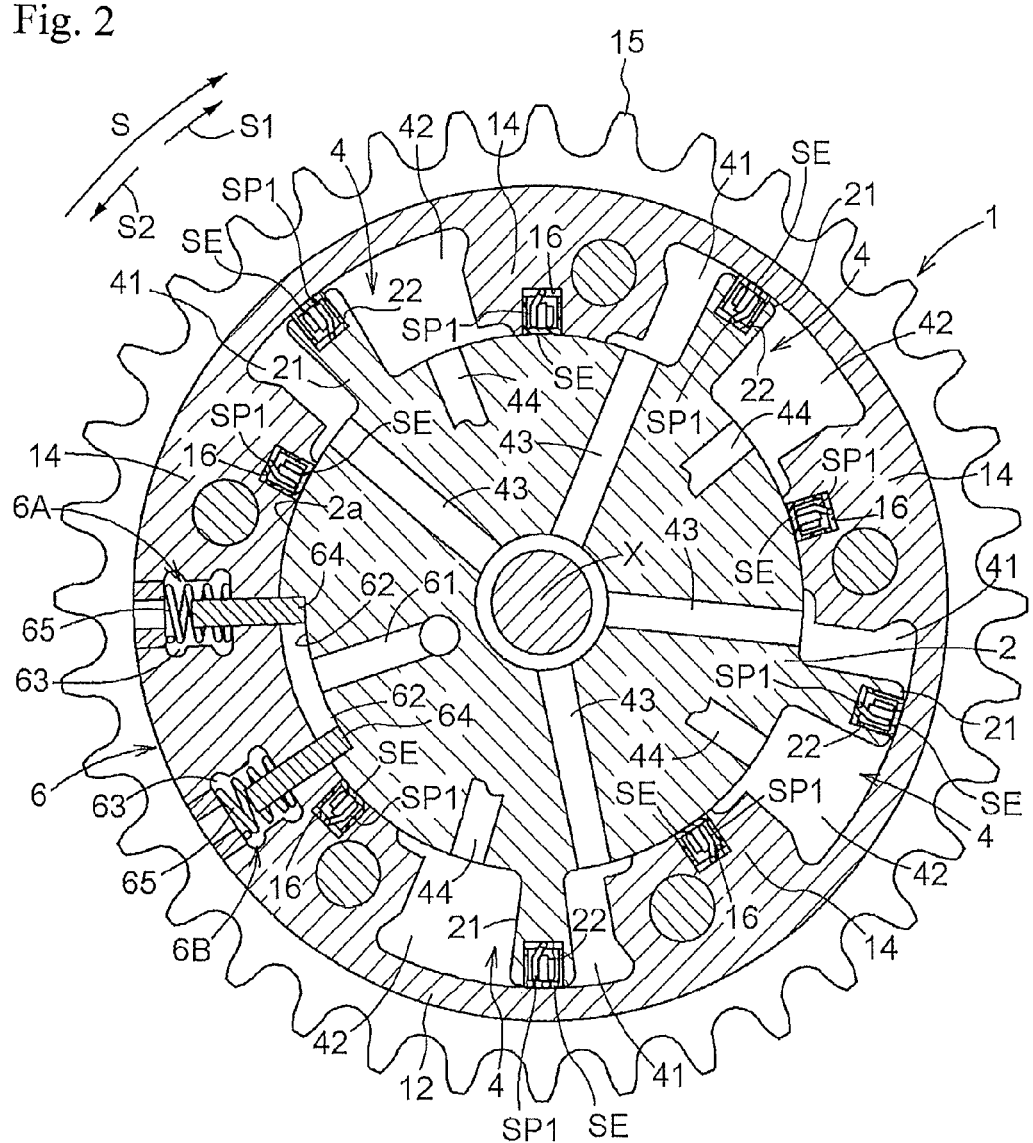
FIG. 2 is a cross-section view along II-II in FIG. 1, and is a cross-section view of the valve opening/closing timing control device when in a locked state.

When the crank shaft is rotatingly driven, the rotating driving force therefrom is transmitted through a power transmission member 102 to the timing sprocket 15, and the housing 1 is rotatingly driven in the rotation direction S shown in FIG. 2. With the rotating driving of the housing 1, the internal rotor 2 is rotatingly driven in the rotation direction S, the camshaft 101 is caused to rotate, and the cam provided to the camshaft 101 presses down and opens the intake valve of the engine.

As shown in FIG. 2, a plurality of protruding sections 14 protruding in an inward radial direction are formed on the external rotor 12 so that a spacing is present between each other along the rotation direction S, whereby fluid pressure chambers 4 are formed by the external rotor 12 and the internal rotor 2. The protruding sections 14 also function as shoes in relation to an outer peripheral surface 2a of the internal rotor 2. A protruding section 21 is formed on a portion of the outer peripheral surface 2a that faces a fluid pressure chamber 4. The fluid pressure chamber 4 is partitioned along the rotation direction S by the protruding section 21 into an advance chamber 41 and a retard chamber 42. Accordingly, the protruding sections 21 correspond to the "partition section" of the present invention. The protruding sections 14 also correspond to the "partition section" of the present invention in that protruding section 14 partitions the fluid pressure chamber 4 into the advance chamber 41 and the retard chamber 42. The present embodiment is configured so that there are fluid pressure chambers 4 in four locations; however, this is not provided by way of limitation.

As shown in FIGS. 1 and 2, advancement passages 43 for connecting each of the advance chambers 41 to a predetermined port of a fluid control valve 53 described further below are formed in the internal rotor 2 and the camshaft 101. Also, retardation passages 44 for connecting each of the retard chambers 42 to a predetermined port of the fluid control valve 53 are formed in the internal rotor 2 and the camshaft 101. The fluid control valve 53 is controlled, the working fluid is fed or discharged through the advancement passages 43 and the retardation passages 44 to or from the advance chambers 41 and the retard chambers 42, or the feeding/discharging of the working fluid is blocked, and the fluid pressure of the working fluid is made to act on a vane 22. The relative rotation phase is thus displaced in the advancement direction or the retardation direction or maintained at a desired phase. The advancement direction is a direction in which the volume of each of the advance chambers 41 increases, and is indicated by the arrow S1 in FIG. 2. The retardation direction S2 is a direction in which the volume of each of the retard chambers 42 increases, and is indicated by the arrow S2 in FIG. 2. The relative rotation phase at which the volume of each of the retard chambers 42 is at a maximum is a most retarded phase, and the relative rotation phase at which the volume of each of the advance chambers 41 is a most advanced phase.

[Lock Mechanism]

The valve opening/closing timing control device includes a lock mechanism 6 capable of restraining the relative rotating phase of the internal rotor 2 with respect to the housing 1 and thereby restraining the relative rotation phase of the internal rotor 2 with respect to the housing 1 at a predetermined phrase (hereafter referred to as "lock phase") between the most retarded phase and the most advanced phase. The relative rotation phase is locked at the lock phase in circumstances immediately after the engine has been started in which the fluid pressure of the working fluid is not stable, whereby it is possible to maintain the rotation phase of the camshaft 101 relative to the rotation phase of the crank shaft in a suitable manner and produce a stable engine rotation. For example, if the lock phase is a phase at which the opening timings of the intake valve and the exhaust valve (not shown) partly overlap, it is possible to reduce the amount of hydrocarbons (HC) when the engine is started, and to obtain a low-emission engine.

As shown in FIGS. 1 and 2, the lock mechanism 6 includes a first lock part 6A, a second lock part 6B, a lock groove 62 formed on the outer peripheral surface 2a of the internal rotor 2, and a lock passage 61 for connecting the lock groove 62 to a predetermined port of a fluid switching valve 54 described further below. Each of the first lock part 6A and the second lock part 6B includes an accommodating part 63 formed on the external rotor 12, a lock member 64 capable of advancing and retreating in a radial direction along the shape of the accommodating part 63, and a spring 65 for biasing the lock member 64 to the lock groove 62-side.

As shown in FIG. 2, when the lock member 64 of each of the lock parts 6A, 6B is inserted into the lock groove 62, the relative rotating motion of the internal rotor 2 is restrained, and the relative rotation phase is restrained at the lock phase. When the fluid switching valve 54 is controlled and the working fluid is fed to the lock groove 62, although not shown, the lock member 64 of each of the lock parts 6A, 6B retreats from the lock groove 62 towards the accommodating part 63-side, and the restraining of the relative rotation phase is disengaged. The internal rotor 2 is subsequently able to perform a relative rotating motion with respect to the housing 1, and it is possible to obtain a relative rotation phase in accordance with the running state.

[Fluid Feed/Discharge Mechanism]

As shown in FIG. 1, a fluid feed/discharge mechanism 5 includes an oil pan 51 for storing engine oil, which is an example of a "working fluid"; a mechanical-type oil pump 52, which is driven by having the rotating driving force of the crank shaft transmitted thereto; an electromagnetic-control-type fluid control valve (OCV) 53 for controlling the feeding, discharging, and the blocking of the feeding/discharging of the engine oil with respect to the advancement passages 43 and the retardation passages 44; and an electromagnetic-control-type fluid switching valve (OSV) 54 for controlling the feeding and the discharging of the engine oil with respect to the lock passage 61. The fluid control valve 53 and the fluid control valve 54 are controlled by an ECU 7.

The fluid control valve 53 is configured as a spool-type, and operates on the basis of a control, performed by the engine control unit (ECU) 7, of the amount of electricity supplied. By switching the fluid control valve 53, it is possible to perform a control, such as: feeding hydraulic oil into the advance chamber 41 and discharging hydraulic oil from the retard chamber 42; discharging hydraulic oil from the advance chamber 41 and feeding hydraulic oil into the retard chamber 42; and blocking the feeding/discharging of hydraulic oil in relation to the advance chamber 41 and the retard chamber 42.

The fluid switching valve 54 is configured as a spool-type, and operates on the basis of a control, performed by the engine control unit (ECU) 7, of the amount of electricity supplied. By switching the fluid switching valve 54, it is possible to perform a control such as feeding the engine oil to the lock groove 62 or discharging engine oil from the lock groove 62.

[Torsion Spring]

As shown in FIG. 1, a torsion spring 3 is provided across the internal rotor 2 and the front plate 11. The torsion spring 3 applies a biasing force to the housing 1 and the internal rotor 2 so that the relative rotation phase is displaced towards the advancement side. Normally, when the engine is running, a displacement force in the retardation direction and the advancement direction, caused by a variation in the torque of the camshaft 101, acts on the driven-side rotating body. This displacement force, on average, acts in the retardation direction, and acts on the driven-side rotating body so as to be displaced in the retardation direction. However, the torsion spring 3 being provided makes it possible for the relative rotation phase to be displaced in the advancement direction in a smooth and speedy manner irrespective of the average displacement force in the retardation direction caused by a variation in the torque of the camshaft 101.

[Seal Member/Biasing Member]

The external rotor 12 is configured by machining the protruding sections 14 on an inner periphery side from a hollow cylindrical material, and the internal rotor 2 is configured by machining the protruding sections 21 on an outer periphery side from a solid cylindrical material. Therefore, even in an instance in which it has been possible for machining to be performed in an accurate manner, there is a possibility of some unevenness remaining on side surfaces of the external rotor 12 facing the fluid pressure chambers 4 and side surfaces of the internal rotor 2 facing the fluid pressure chambers 4. Accordingly, there may be a possibility of a gap forming between a protruding section 14 and the internal rotor 2 and between a protruding section 21 and the external rotor 12, and of the working fluid leaking, through the gap, between the retard chamber 42 and the advance chamber 41. If the working fluid leaks between the advance chamber 41 and the retard chamber 42, the control of the relative rotation phase becomes less accurate, and it becomes impossible to obtain an open/close timing that is in accordance with the running state of the engine.

Therefore, as shown in FIG. 2, in order to prevent the leakage of the working fluid, a seal member SE is arranged on a portion of the protruding sections 14 facing the internal rotor 2 and a portion of the protruding sections 21 facing the external rotor 12. Also, there is provided a wire spring SP1, which functions as a biasing member for biasing the seal member SE towards the internal rotor 2-side or the external rotor 12-side in order to increase the sealing performance of the seal member SE. Details of the seal member SE and the wire spring SP1 will now be described. The configuration of the seal member SE and the wire spring SP1 arranged on a portion of the protruding sections 14 facing the internal rotor 2 and the configuration of the seal member SE and the wire spring SP1 arranged on a portion of the protruding sections 21 facing the external rotor 12 are identical. Therefore, a description shall be given only for the seal member SE and the wire spring SP1 arranged on a portion of the protruding sections 21 facing the external rotor 12.

Figure 3:
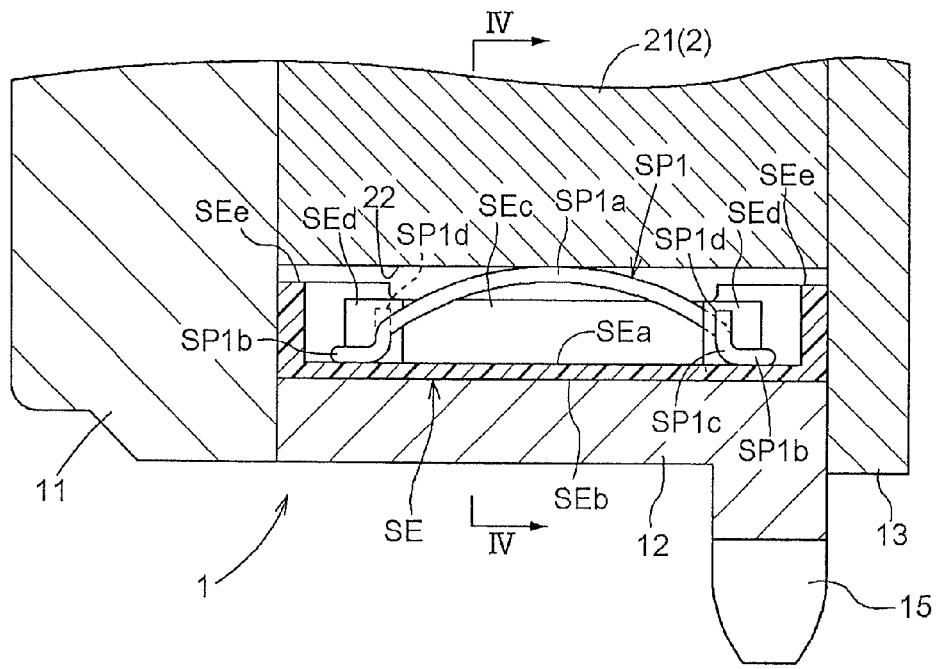
FIG. 3 is an expanded cross-section view around the partition section on the internal rotor side.
Figure 4:
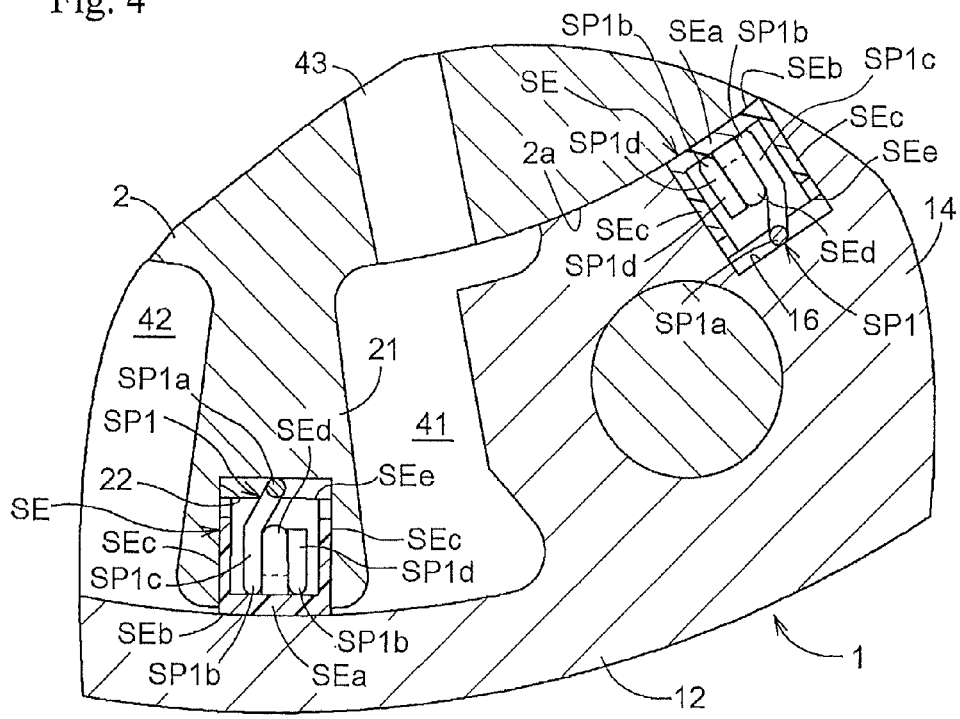
FIG. 4 is a cross-section view along IV-IV in FIG. 3.

As shown in FIGS. 3 and 4, a mounting groove 22 (or a mounting groove 16 in a protruding section 14) extending along a rotation axial center X from a front plate 11-side to a rear plate 13-side is formed in a distal end section of the protruding sections 21 facing the external rotor 12. The mounting groove 22 has a rectangular cross-section profile.

Figure 5A:
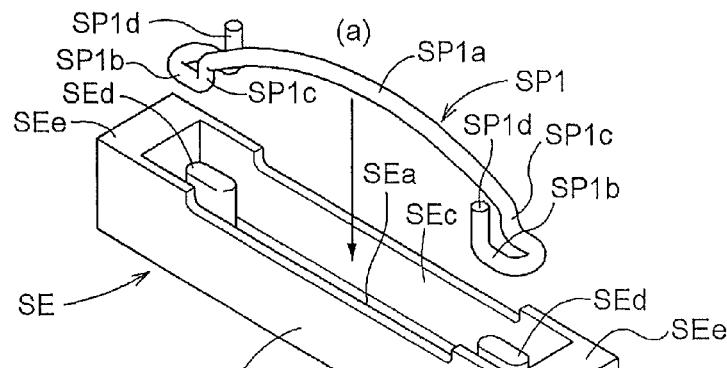
FIG. 5 is a drawing showing a seal member and a wire spring according to the present invention, where (A) is a perspective view when the biasing member is being affixed, and (B) is a lateral cross-section view after the biasing member has been affixed.
Figure 5B:
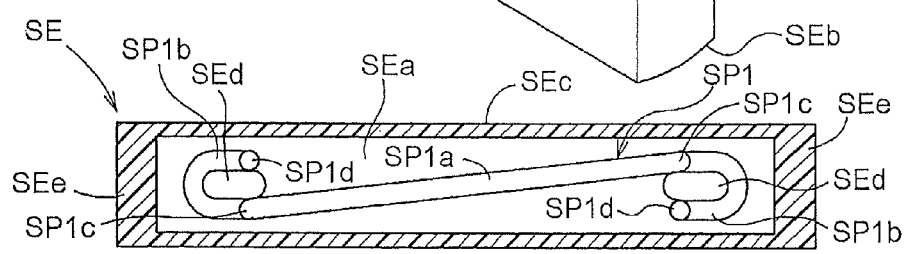

The seal member SE is shaped so as to be capable of sliding in a radial direction along the profile of the mounting groove 22. As shown in FIGS. 3 through 5, the seal member SE includes a sliding contact section SEa, a peripheral wall section SEc, a leg section SEe, and a convex section SEd. A bottom surface SEb of the sliding contact section SEa is in sliding contact with an inner peripheral surface of the external rotor 12. The bottom surface SEb of the sliding contact section SEa is formed so as to have an arc-shaped cross-section profile as shown in FIG. 5(a). The peripheral wall section SEc is formed in the shape of a box by having the four-sided periphery of the sliding contact section SEa erected vertically. The leg section SEe is formed by further vertically erecting a portion of the peripheral wall section SEc adjacent to the front plate 11 and the rear plate 13. The convex section SEd is formed at two locations so as to vertically stand relative to the sliding contact section SEa. The dimension of the sliding contact section SEa in a long-side direction in FIG. 5 shall hereafter be referred to as "length." the dimension of the sliding contact section SEa in a short-side direction in FIG. 5 shall be referred to as "width." and the dimension of the leg section SEe in a direction of erection in FIG. 5 shall be referred to as "height".

Each of the convex sections SEd is positioned between leg sections SEe on both sides with a predetermined spacing present with respect to each of the leg sections SEe. The width of the convex sections SEd is smaller than the width of the sliding contact section. The height of the convex sections SEd is smaller than the height of the leg section SEe.

As shown in FIGS. 3 through 5, the wire spring SP1 includes a first biasing section SP1a curving in an arc shape; a connecting section SP1c linking to each of both end sections of the first biasing section SP1a and extending in the height direction; and a second biasing section SP1b connecting to each of the connecting sections SP1c and curving in a U-shape. Each of the first biasing section SP1a and the second biasing section SP1b exerts a biasing force through elastic deformation. The wire spring SP1 is configured so that a surface at which the first biasing section SP1a elastically deforms and a surface at which the second biasing sections SP1b elastically deform are orthogonal with respect to each other. Each of the second biasing sections SP1b engages with each of the convex sections SEd, whereby it is possible to having the wire spring SP1 engage with the seal member SE. The first biasing section SP1a is able to exert its biasing force in a state in which the wire spring SP1 engages with the seal member SE.

The spacing between both side sections of the U-shape of the second biasing sections SP1b is set to be slightly smaller than the width of the convex sections SEd. The total length of the wire spring SP1 is set to be slightly larger than the distance between respective length-direction outer side surfaces of the two convex sections SEd. Therefore, when the second biasing section SP1b is pushed down into a predetermined position around the convex section SEd, the second biasing section SP1b clamps the convex section SEd with a biasing force acting inwards in the width direction caused by elastic deformation of the second biasing section SP1b. Alternatively, if the second biasing section SP1b is placed around the convex section SEd in a state of being spread open so that both side sections of the U-shape are open, and the force acting to spread open is subsequently disengaged, the second biasing section SP1b clamps the convex section SEd with a biasing force acting inwards in the width direction caused by elastic deformation of the second biasing section SP1b. As a result, the wire spring SP1 engages with the seal member SE. Also, since the second biasing sections SP1b at two locations individually clamp the convex section SEd at two locations, the wire spring SP1 engages with the seal member SE in a reliable manner.

An upright section SP1d, which is parallel to the connecting section SP1c, is provided to an end section of the second biasing section SP1b on a side opposite the connecting section SP1c. The convex section SEd is also clamped by the connecting section SP1c and the upright section SP1d. The two connecting sections SP1c are arranged not facing one another but on opposing corners. In other words, the first biasing section SP1a is in a state of extending diagonally with respect to the second biasing section SP1b on both sides. Therefore, even if a force is applied to the wire spring SP1 in such a direction so as to topple the wire spring SP1, the wire spring SP1 does not topple, and remains in a stable state.

Thus, the biasing force from the second biasing section SP1b causes the wire spring SP1 to engage with the seal member SE. If a pressing force in the height direction acts on the first biasing section SP1a in this state, the first biasing section SP1a undergoes elastic deformation in the height direction and the length direction, and a biasing force is exerted from the first biasing section SP1a. In this instance, the second biasing section SP1b merely engages with the convex section SEd by a biasing force, and is capable of undergoing a sliding motion in the length direction along the convex section SEd. Therefore, elastic deformation of the first biasing section SP1a in the length direction is not obstructed. As described above, the leg section SEe and the convex section SEd are formed at a predetermined distance from each other; therefore, even when elastic deformation of the first biasing section SP1a causes an increase in the length of the wire spring SP1 in the length direction, the second biasing section SP1b does not come into contact with the leg section SEe.

The direction of clamping by the second biasing section SP1b and the direction of clamping by the connecting section SP1c and the upright section SP1d are orthogonal. Therefore, the wire spring SP1 does not rattle, and elastic deformation of the wire spring SP1 in the length direction becomes more stable.

The wire spring SP1 is set so that the overall height is greater than that of the leg section SEe and so that the height of the connecting section SP1c is smaller than that of the leg section SEe. Accordingly, when the first biasing section SP1a is pressed and made to undergo elastic deformation, the first biasing section SP1a can undergo elastic deformation until a top end of the first biasing section SP1a reaches the height of a top end of the leg section SEe. The height of the leg section SEe is set so that the deformation of the first biasing section SP1a does not exceed the yield point and the first biasing section SP1a does not undergo plastic deformation. Specifically, the top end of the leg section SEe comes into contact with a bottom section of the mounting groove 22, whereby the range of elastic deformation of the first biasing section SP1a is restricted. Accordingly, the leg section SEe corresponds to the "restricting section" of the present invention.

When the seal member SE is affixed to the valve opening/closing timing control device, as shown in FIGS. 3 and 4, the peripheral wall section SEc is positioned so as to follow an inner surface of the mounting groove 22, the front plate 11, and the rear plate 13; and the seal member SE is biased by the wire spring SP1 against the external rotor 12 positioned opposite; thereby ensuring the sealing performance of the seal member SE.

The seal member SE can be made by injection molding using, e.g., a resin having excellent wear resistance and oil resistance as a material. The wire spring SP1 may be made from, e.g., stainless steel.

According to this configuration, even if the seal member SE and the wire spring SP1 are manufactured separately, the task of affixing the wire spring SP1 to the seal member SE becomes speedy and simple. The engaging of the wire spring SP1 to the seal member SE also becomes more reliable.

The present embodiment is configured so that each of the second biasing sections SP1b at two locations clamp each of the convex sections SEd at two locations. However, a configuration is also possible in which in a state in FIG. 5(B) where the second biasing sections SP1b at two locations individually engage with the convex sections SEd at two locations, the convex sections SEd at two locations are both clamped at the same time by a biasing force caused by elastic deformation of the first biasing section SP1a in the length direction. In such an instance, the total length of the wire spring SP1 is set so as to be smaller than the distance between the length-direction outer side surfaces of the two convex sections SEd in a state in which the wire spring SP1 is not deformed.

First Alternative Embodiment

The configuration of the seal member and the biasing member is not limited to that according to the embodiment described above. A description of another embodiment will now be given with reference to the accompanying drawings. Descriptions shall not be given in relation to structures similar to those according to the embodiment described above. Locations of identical structures shall be affixed with identical numerals.

Figure 6A:
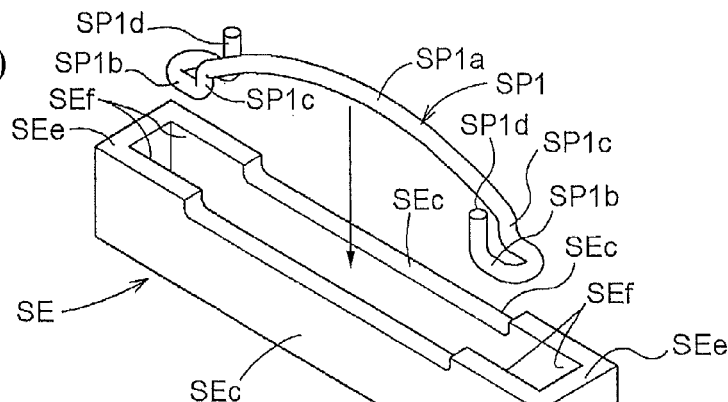
FIG. 6 is drawing showing a seal member and a wire spring according to a first alternative embodiment, where (A) is an exploded perspective view, and (B) is a lateral cross-section view after the biasing member has been affixed.
Figure 6B:
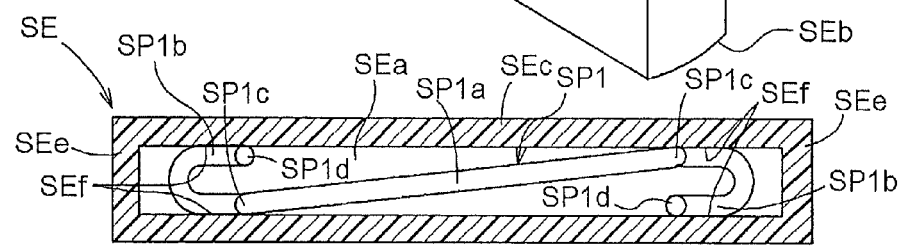

For example, as shown in FIG. 6, a biasing force of the second biasing section SP1b acting so as to spread in the width direction can be used to engage the wire spring SP1 to the seal member SE. The spacing between both end sections of the U-shape of the second biasing section SP1b is set so as to be slightly larger than the inner width of the peripheral wall section SEc. Therefore, if the second biasing section SP1b is pushed down into a predetermined position between the peripheral wall section SEc that face each other, the second biasing section SP1b presses against the peripheral wall section SEc on both sides with a biasing force acting outwards in the width direction caused by elastic deformation of the second biasing section SP1b. Alternatively, if the wire spring SP1 is placed along the inside of the peripheral wall section SEc that face each other in a state in which the width of the second biasing sections SP1b at the two locations of the wire spring SP1 are squeezed so as to be smaller than the inner width of the peripheral wall section SEc, and the force acting to squeeze the wire spring SP1 is disengaged, the second biasing section SP1b presses against the peripheral wall section SEc on both sides with a biasing force acting outwards in the width direction caused by elastic deformation of the second biasing section SP1*b*. As a result, the wire spring SP1 engages with the seal member SE. A recess section SEf, which is configured from the sliding contact section SEa and a portion of the peripheral wall section SEc to which the second biasing section SP1*b* is engaged, corresponds to the "recess section" of the present invention.

Second Alternative Embodiment

For example, as shown in FIG. 7, the biasing force of the first biasing section SP1*a* acting to spread in the length direction and the biasing force of the second biasing section SP1*b* acting to spread in the length direction can both be used to engage with the wire spring SP1 to the seal member SE. In such an instance, the recess section SEf, which is configured from the sliding contact section SEa and portions of the peripheral wall section SEc that face each other in the length direction, corresponds to the "recess section" of the present invention. When a pressing force in the height direction acts on the first biasing section SP1*a*, the first biasing section SP1*a* undergoes elastic deformation in the height direction and the length direction, and the second biasing section SP1*b* undergoes elastic deformation in the length direction.

Third Alternative Embodiment

As shown in FIG. 8, the wire spring SP1 may be turned back so as to be double in the width direction, where the second biasing section SP1*b* is formed at two locations by turned-back sections. The present embodiment is configured so that convex sections SEd are formed at two locations of the seal member SE and each of the second biasing sections SP1*b* clamps each of the convex sections SEd in the width direction. However, a configuration is also possible in which in a state where each of the second biasing sections SP1*b* are individually engaged to the convex sections SEd, the convex sections SEd at two locations are clamped at the same time by a biasing force caused by elastic deformation of the first biasing section SP1*a* in the length direction. According to the present configuration, the first biasing section SP1*a* comes into contact with the mounting groove 22 at two spots. Compared to an instance in which the contact is made at a single spot, the biasing force is transmitted in a stable manner between the mounting groove 22 and the seal member SE.

Fourth Alternative Embodiment

As shown in FIG. 9, the wire spring SP1 may be turned back so as to be double both in the width direction and the height direction, where the second biasing section SP1*b* is configured at two locations by turned-back sections. The present embodiment is configured so that the convex sections SEd are formed at two locations on the seal member SE and each of the second biasing sections SP1*b* clamps each of the convex sections SEd in the width direction.

Fifth Alternative Embodiment

As shown in FIG. 10, the wire spring SP1 may be turned back so as to be double both in the width direction and the height direction, where the second biasing section SP1*b* is configured at one location by a turned-back section. The present embodiment is configured so that the convex sections SEd are formed at one location on the seal member SE and the second biasing section SP1*b* clamps the convex section SEd in the length direction. In the present embodiment, increasing the length of the convex section SEd makes it possible to affix the wire spring SP1 to the seal member SE in a stable manner.

Sixth Alternative Embodiment

The examples given above are those in which the biasing member is configured from a wire spring. However, this is not provided by way of limitation, and the biasing member may also be configured from a plate spring. For example, a configuration is also possible in which, as shown in FIG. 11, both end portions of a plate spring SP2, in which a plate material is bent and a first biasing section SP2*a* is formed, are turned back downwards and inwards in the length direction in the drawing, and second biasing sections SP2*b* are formed at two locations. The present embodiment is configured so that a convex section SEd is formed at one location of the seal member SE, and the second biasing sections SP2*b* at two locations clamp the convex section SEd in the length direction. Also, a guide groove SEg having a width that is slightly greater than the width of the second biasing sections SP2*b* is formed on surface of the convex section SEd at which the corresponding second biasing section SP2*b* is engaged. It is thereby possible to affix the plate spring SP2 to a fixed position on the seal member SE, and to cause the plate spring SP2 to undergo elastic deformation along the guide groove SEg in a stable manner.

Seventh Alternative Embodiment

Similarly, a configuration is also possible in which, as shown in FIG. 12, both end portions of a plate spring SP2, in which a plate material is bent and a first biasing section SP2*a* is formed, are turned back downwards and inwards in the length direction in the drawing, second biasing sections SP2*b* are formed at two locations, and an elongated hole-shaped cutout is provided at a distal end section of the second biasing sections SP2*b*. The present embodiment is configured so that pin-shaped convex sections SEd are formed at two locations on the seal member SE, and in a state in which each of the second biasing sections SP2*b* is individually engaged to the convex sections SEd, the convex sections SEd at two locations are clamped at the same time by a biasing force caused by elastic deformation of the first biasing section SP2*a* in the length direction. When a pressing force in the height direction acts on the first biasing section SP2*a*, the plate spring SP2 undergoes elastic deformation so as to spread in the length direction. However, since the cutouts play the role of loose holes, the second biasing sections SP2*b* do not depart from the convex section SEd.

Eighth Alternative Embodiment

A configuration is also possible in which, as shown in FIG. 13, with regards to a plate spring SP2 in which a plate material is bent and a first biasing section SP2*a* is formed, both end portions, whose respective widths are greater than that of the first biasing section SP2*a*, are each turned back upwards and inwards in the width direction in the drawing and second biasing sections SP2*b* are formed at two locations. The present embodiment is configured so that each of the second biasing sections SP2*b* presses, outwards in the width direction, the peripheral wall section SEc that face each other in the width direction. In this instance, a recess section SEf configured from the sliding contact section SEa and portions of the peripheral wall section SEc that face each other in the width direction corresponds to the "recess" of the present invention.

Ninth Alternative Embodiment

A configuration is also possible in which, as shown in FIG. 14, with regards to a plate spring SP2 in which a plate material is bent, each of both end portions of the plate material are turned back upwards and inwards in the length direction in the drawing, and first biasing sections SP2a are formed; a center portion, whose width is greater than that of the first biasing sections SP2a, is folded back upwards and inwards in the width direction; and a second biasing section SP2b is formed at one location. The present embodiment is configured so that the second biasing section SP2b presses, outwards in the width direction, the peripheral wall section SEc that face each other in the width direction. Also, guide grooves SEg whose width is slightly greater than the width of the second biasing section SP2b are formed on the surfaces of the peripheral wall section SEc at which the corresponding second biasing section SP2b engages. The guide groove SEg makes it possible to affix the plate spring SP2 to a fixed position on the seal member SE, and to stabilize the plate spring SP2 relative to the seal member SE. Accordingly, in the present embodiment, the guide groove SEg also functions as the recess section SEf.

Tenth Embodiment

Figure 15A:
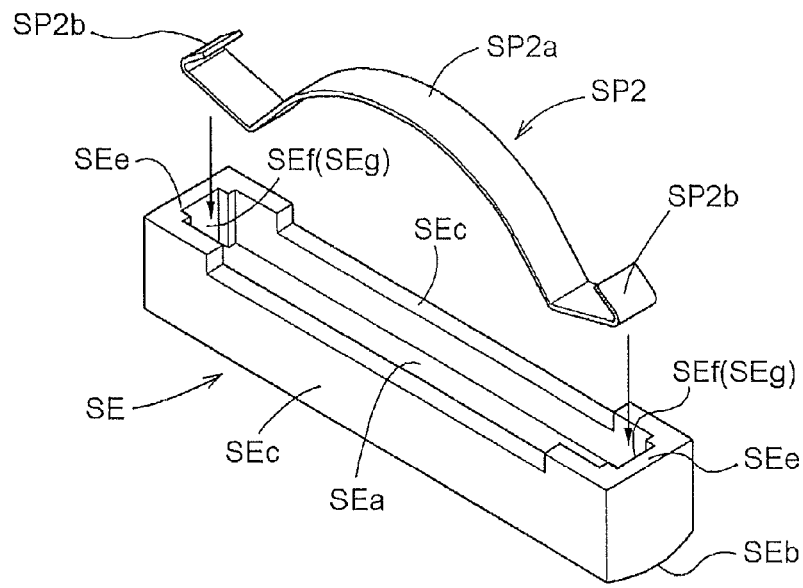
FIG. 15 is a drawing showing a seal member and a plate spring according to a tenth alternative embodiment, where (A) is an exploded perspective view, (B) is a lateral cross-section view after the biasing member has been affixed, and (C) is a vertical cross-section view after the biasing member has been affixed.
Figure 15B:
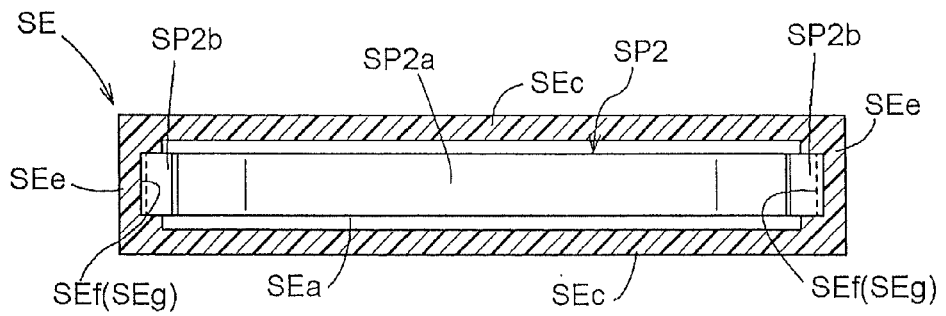
Figure 15C:
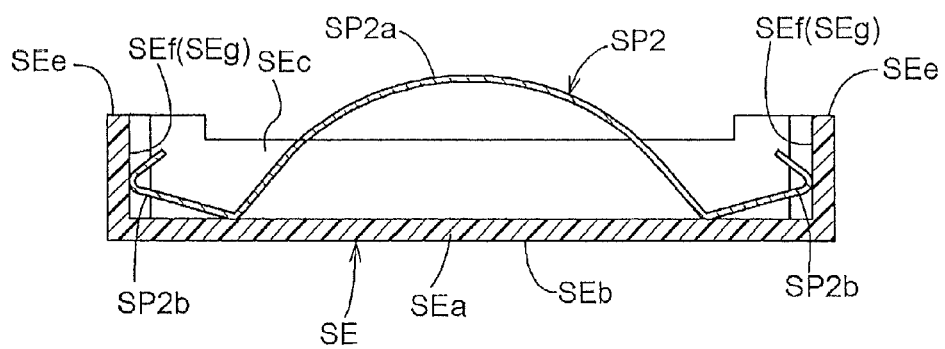

A configuration is also possible in which, as shown in FIG. 15, with regards to a plate spring SP2 in which a plate material is bent, each of both end portions of the plate material are turned back upwards and inwards in the length direction in the drawing, and first biasing sections SP2a are formed; both end portions are folded back upwards and inwards in the length direction; and a second biasing section SP2b is formed at two locations. The present embodiment is configured so that the second biasing section SP2b presses, outwards in the length direction, the leg sections SEe that face each other in the length direction. Also, a guide groove SEg whose width is slightly greater than the width of the second biasing section SP2b is formed on the surface of the leg section SEe at which the corresponding second biasing section SP2b engages. It is possible to affix the plate spring SP2 to a fixed position on the seal member SE, and to stabilize the plate spring SP2 relative to the seal member SE. Accordingly, in the present embodiment, the guide groove SEg also functions as the recess section SEf.

Other Embodiments

In the embodiments described above, the protruding sections 21 are formed as partition sections on the internal rotor 2. However, this is not provided by way of limitation. For example, although not shown, a configuration is also possible in which a vane groove is formed on the internal rotor 2 and a plate-shaped vane functioning as the partition section is arranged in the vane groove. In this instance, the vane itself is biased towards the external rotor 12-side, and is made to play a role of a seal member. Therefore, a configuration is used in which the seal member and the biasing member according to the present invention are arranged only on the protruding section 14 functioning as the partition section on the external rotor 12-side.

The present invention is characterized in the configuration of the seal member and the biasing member. Therefore, other structures are not limited to the configuration described above. For example, the seal member and the biasing member according to the present invention may be applied to a valve opening/closing timing control device on the exhaust valve-side. The lock mechanism may also be not provided, or the lock mechanism may be configured differently.

Also, in the embodiments described above, the biasing member is configured from a wire spring or a plate spring; however, this is not provided by way of limitation. For example, although not shown, the biasing member may be configured from a member in which a wire spring and a plate spring are mixed, or from a coil spring.

INDUSTRIAL APPLICABILITY

The present invention can be used for a valve opening/closing timing control device of an automotive or anther internal combustion engine.

REFERENCE SIGNS LIST

1 Housing (drive-side rotating body)
2 Internal rotor (driven-side rotating body)
4 Fluid pressure chamber
14 Protruding section (partition section)
21 Protruding section (partition section)
41 Advance chamber
42 Retard chamber
SE Seal member
SEd Convex section
SEe Leg section (restricting section)
SEf Recess section
SP1 Wire spring (biasing member)
SP2 Plate spring (biasing member)

The invention claimed is:

1. A valve opening/closing timing control device, comprising:
a drive-side rotating body, which synchronously rotates relative to a crankshaft;
a driven-side rotating body, which is arranged coaxially with respect to the drive-side rotating body and which synchronously rotates with a camshaft for opening/closing a valve in an internal combustion engine;
a partition section, which is provided to at least one of the drive-side rotating body and the driven-side rotating body so as to partition a fluid pressure chamber, which is formed by the drive-side rotating body and the driven-side rotating body, into a retard chamber and an advance chamber;
a seal member, which is arranged either at a position, of the partition section, facing the drive-side rotating body or the driven-side rotating body, or at a position, of the drive-side rotating body or the driven-side rotating body, facing the partition section, and which prevents leakage of a working fluid between the retard chamber and the advance chamber caused by a relative rotation between the drive-side rotating body and the driven-side rotating body; and
a biasing member comprising: a first biasing section, which either biases the seal member from the partition section side towards the drive-side rotating body side or the driven-side rotating body side, or biases the seal member from the drive-side rotating body side or the driven-side rotating body side towards the partition section side; and a second biasing section, which engages with the seal member by a biasing force caused by elastic deformation of the second biasing section,
wherein the first biasing section and the second biasing section are formed by a wire spring having a curvature, and the biasing member engages the seal member by a biasing force of the second biasing section caused by the curvature of the wire spring, and the second biasing section engages the biasing member with the seal member by exerting the biasing force in a circumferential direction of the drive-side rotating body or the driven-side rotating body, the circumferential direction being different from a biasing direction of the first biasing section.

2. The valve opening/closing timing control device according to claim 1, wherein
a convex section is formed on the seal member; and
the biasing member is configured so that the convex section is clamped by a biasing force caused by elastic deformation and the biasing member engages with the seal member.

3. The valve opening/closing timing control device according to claim 1, wherein
a recess section is formed on the seal member; and
the biasing member is configured so that two side surfaces of the recess section that face each other are pressed by a biasing force caused by elastic deformation and the biasing member engages with the seal member.

4. The valve opening/closing timing control device according to claim 3, wherein portions of the first biasing section other than a portion brought into contact with the drive-side rotating body, the driven-side rotating body or the partition section are accommodated in the recess section.

5. The valve opening/closing timing control device according to claim 1, wherein
a convex section is formed at two locations on the seal member; and
the biasing member is configured so that in a state in which individual sites at two locations on the biasing member independently and respectively engage with the convex sections at the two locations, the convex sections in the two locations are clamped by a biasing force caused by elastic deformation, and the biasing member engages with the seal member.

6. The valve opening/closing timing control device according to claim 1, wherein a restricting section for restricting the range of elastic deformation of the biasing member is provided across the seal member and the partition section so that the biasing member does not become sandwiched between the seal member and the partition section and does not undergo plastic deformation.

7. The valve opening/closing timing control device according to claim 1, wherein a restricting section for restricting the range of elastic deformation of the biasing member is provided across the seal member and the drive-side rotating body or the driven-side rotating body facing the partition section so that the biasing member does not become sandwiched between the seal member and the drive-side rotating body or the driven-side rotating body facing the partition section and does not undergo plastic deformation.

8. The valve opening/closing timing control device according to claim 1, wherein a face of the seal member to be brought into contact with the drive-side rotating body, the driven-side rotating body or the partition section by the biasing force of the first biasing section is arc-shaped.

* * * * *